May 22, 1934.  B. A. WITTKUHNS  1,959,803

THERMIONIC FOLLOW-UP AND REMOTE CONTROL SYSTEM

Filed June 11, 1931  2 Sheets-Sheet 1

INVENTOR
BRUNO A. WITTKUHNS
BY
Herbert H. Thompson
his ATTORNEY.

May 22, 1934.  B. A. WITTKUHNS  1,959,803
THERMIONIC FOLLOW-UP AND REMOTE CONTROL SYSTEM
Filed June 11, 1931  2 Sheets-Sheet 2

INVENTOR
BRUNO A. WITTKUHNS.
By Herbert H. Thompson
HIS ATTORNEY

Patented May 22, 1934

1,959,803

UNITED STATES PATENT OFFICE 1,959,803

THERMIONIC FOLLOW-UP AND REMOTE CONTROL SYSTEM

Bruno A. Wittkuhns, Chatham, N. J., assignor to Sperry Gyroscope Company, Inc., Brooklyn, N. Y., a corporation of New York Application June 11, 1931, Serial No. 543,694

3 Claims. (Cl. 172—239)

This invention relates to electrical follow-up or remote control systems wherein the position of a sending instrument, such as the sensitive element of a gyroscopic compass, controls the position of a follow-up element or other receiving device. In substantially all follow-up systems there is a decided tendency for the follow-up element to "hunt" around its position of rest or coincidence with the position of the sensitive element, that is, to mechanically oscillate back and forward through a small arc across this position. Heretofore this hunting had been found desirable in gyroscopic compasses because it maintained the bearings and other parts "nascent", that is, free from static friction. However, there are many objections to mechanical hunting because it sets up similar oscillations in the repeater compasses driven from the master compass rendering them difficult to read. According to my invention I propose to entirely eliminate this mechanical hunting which is usually of a magnitude of a degree or more and of a frequency on the order of 80 per minute, more or less. In its stead I propose to set up a minute vibration, oscillation, or tremor in the system, the magnitude of which is so small and its period so rapid as not to be transmitted to the repeater motors, but which is sufficient to keep the bearings and other parts nascent. Such oscillations or tremors, while they may be felt by the hand, have a frequency on the order of some six to ten times as great as the mechanical hunting and are of one sixth to one tenth the magnitude.

More particularly my invention constitutes an improvement in my prior follow-up system, Patent No. 1,921,983 dated August 8, 1933 for Follow-up device for gyro compasses.

Referring to the drawings in which two uses of the invention are shown:

Figure 1:
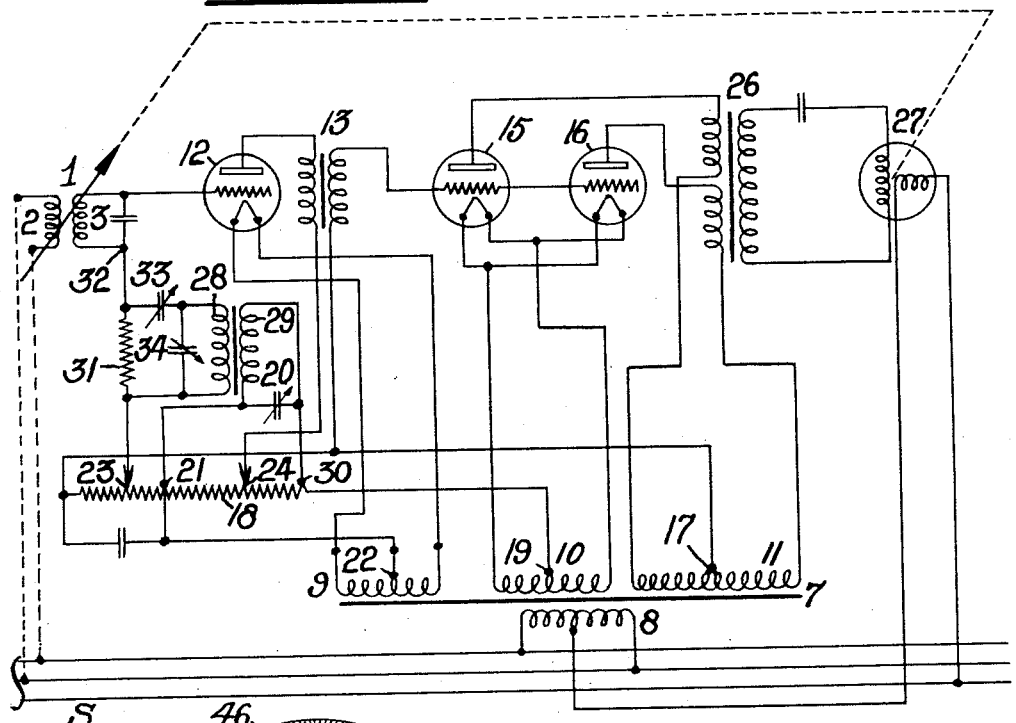
Fig. 1 is a wiring diagram showing the elements of my invention.
Figure 2:
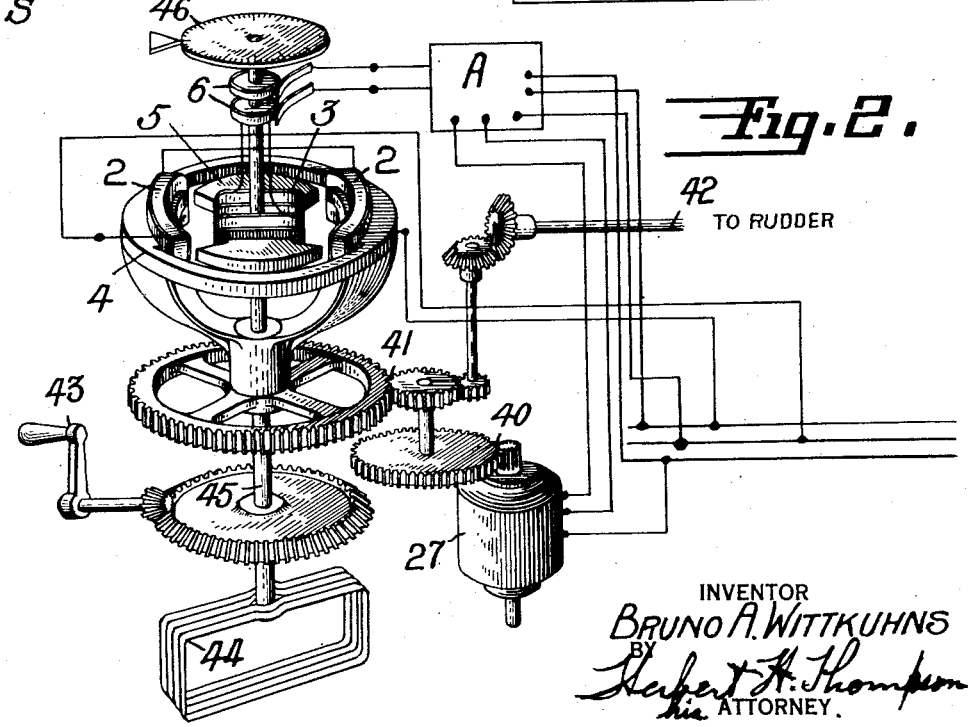
Figs. 2 and 3 are diagrams showing two uses of my invention for the operation of the rudder of a ship or airplane from a direction finder.

At the controller is placed a variable transformer 1 which may be in the form of a pair of coils 2 and 3, one of which is continuously excited from one phase of a source of alternating current S and the other of which is in variable inductance relationship to the first coil. For instance, as shown in Fig. 2, coil 2 may be mounted on a follow-up element 4 and the coil 3 mounted on relatively movable primary element 5. From said coil the current is taken off slip rings 6 to an amplifier shown generally at A in Fig. 2 and in detail in Fig. 1. This amplifier is of the general type disclosed in my prior copending application now Patent No. 1,921,982 dated August 8, 1933 for remote control system in which the signal from the controller is amplified through a system of thermionic tubes having preferably all E. M. F.'s supplied thereto from the same alternating current source S which supplies the controller. For this purpose there is provided a multi-wound transformer 7 having a primary 8 and a plurality of secondary windings 9, 10 and 11. The first tube 12 of the system receives the signal on the grid thereof, the filament being lighted from the winding 9. The output of tube 12 passes through the inter-stage transformer 13 and thence to a pair of power tubes 15—16 arranged in push-pull fashion. These tubes have their filaments lighted from the winding 10 and alternating current of opposite potentials is supplied to the plates thereof by connecting the plates to the opposite ends of the transformer winding 11. The grid bias for these tubes may be obtained by connecting the grids to center tap 17 on the winding 11.

I also employ a variable resistor 18 connected between the mid-point 17 of winding 11 and the mid point 19 of the winding 10. On account of the rectifying action of the push-pull tubes 15—16 acting as a full wave rectifier, an analysis will show that the current flowing through the resistor will be pulsating direct current which may be smoothed out by condensers 20 in a well known manner. I also connect to said resistor, preferably at an intermediate point 21, the mid point 22 of the winding 9. The resistor 21 thus completes the circuits through the first tube as well as the others and by connecting the grid of the first tube to an intermediate point 23 on the resistor a grid bias may also be obtained. A feed back coupling is thus also obtained through the resistor. Also the proper D. C. plate potential is obtained from the same resistor by an intermediate tap 24 connected through transformer 13 to the plate of the first tube. The final output of the tubes 15—16 is led through an output transformer 26 which operates to reverse one phase of the two phase motor 27 so that the same is operated in either direction as governed by the master controller 1. A three phase motor may also be used, as shown in my earlier patents.

As above explained, in circuits of this general character the motor is usually subject to hunting or oscillations about the neutral point and it is the object of this invention to suppress such hunt and to substitute therefor a tremor or small amplitude vibration which will not be transmitted to the instrument to be controlled. It should be understood at this point, that there is a very distinct difference between a hunt and a vibration of the order described above. The hunt is largely mechanical and can be completely stopped by holding the motor shaft stationary by force. The vibration, however, is created purely electrically and will continue under all circumstances, whether the motor shaft is free or not. This has the added advantage that the frequency of the vibration can be held constant or can be changed at will without any mechanical changes. By putting electrical instruments into the motor-feed wires it can be proved that even though the motor is locked and does not move, the current still surges in the windings at the same predetermined frequency. It often happens that a hunt develops on top of the oscillation and special steps must be taken to eliminate the same without disturbing either the signal or the oscillation. In my first mentioned patent I provide special means for creating the oscillation and separate special means to damp out the mechanical hunt. In the present invention one single device takes care of both operations. I, therefore, interpose in my amplifying system an automatic compensator which opposes said tendency to hunt and which also tends to oppose changes in frequency. Said compensator is shown as in the form of a transformer 28, one winding 29 of which is connected across the points of connection of the mid points of windings 9 and 10 to the resistor 18, i. e., across points 21 and 30. The aforesaid condenser 20 forms, it should be noted, with the coil 29 an oscillatory circuit which may be tuned to a desired frequency. The other coil 28 on said transformer is connected across the terminals of a resistor 31 which is placed in series with the grid circuit of the first tube between one terminal 32 of the controller 3 and the slider 23 of the grid biasing resistor 18. Suitable condensers 33 and 34 are used to tune the secondary 28 of the transformer and to create a potential drop of correct phase relation across resistor 31.

If the whole system is in balance on the zero point, the transformer 28—29 has no A. C. potential on its primary except for a faint double frequency ripple. As the transformer, however, provides a close coupling between the grid and plate circuits of the first stage, tube 12 will oscillate at the frequency determined by the constants of the circuit to give the tremor action above referred to. As soon as a signal is transmitted from the controller to the grid of the first tube 12, the transformer will act as a feed-back device to the said grid in opposition to the feed-back connection from the resistor 18 which passes from the point 23 directly to point 32 of the controller. On very weak signals, this reverse feed-back is strong enough to overcome the boosting action of the positive feed-back of the resistor. A strong signal, however, will result in a proportionally increased alternating current voltage drop across the resistor 31 with equally proportionally increased positive feed-back, while the condenser 20 bypasses part of this alternating current potential before it gets to the transformer, thereby weakening its negative feed-back action. Experience shows that it is only necessary to provide damping for small angles of deviation or weak signals, so that a hunt cannot build up. Beyond that, full response to the signal is necessary to keep up the torque of the motor when following an impulse.

It is obvious that even a sudden heavy surge cannot build up into a hunt, as every time it tries to build up when going through zero the damping action of the transformer is actively opposing this tendency which results in very quickly damped hunt oscillations. It is even possible to make this damping so strong that a so-called "dead-beat" or aperiodic action of the motor 27 is accomplished. This can only be done, however, by a negative feed-back strong enough to completely annihilate small signals. This results in a so called "dead spot" around the zero point, in which the motor has no control and will float aimlessly. This again will cause an appreciable lag of the motor on following the control unit. Careful balancing of all components, however, enables me to prevent any hunting and at the same time to keep the dead spot and the lag down to about one minute of arc.

As a result I have produced an amplifier which is very effectively stabilized regarding the action of the motor and at the same time the tremor or electrical oscillation is obtained without an additional transformer as outlined in my aforesaid Patent No. 1,921,983 by the aforesaid feed-back connection to the input of the first tube. The coils 28 and 29 and condensers 20 and 34 form oscillatory circuits which may be tuned to give the desired frequency of tremor, in other words, to a low or sub-audio frequency, which, of course, is very high as compared with the frequency of a mechanical hunt, hereinbefore referred to. This tremor frequency is present under all conditions and in no way interferes with the impulses transmitted. While the tremor frequency passes through the hunt-suppressing device, no interference is produced on account of the differences in frequencies of the hunt and tremor.

As above indicated my invention has application to many forms of follow-up systems or remote control of objects. Fig. 2 shows how my invention may be applied to the control of the rudder for instance on a dirigible craft, such as an airplane or ship, from a radio direction finder or other direction indicator. The controller as described above has the outer coils 2 on the follow-up element 4 which is rotated from the power motor 27 through suitable reduction gearing 40—41. The load, such as the airplane rudder, may be turned from the shaft 42. At 43 is shown a handle for turning the direction finder loop 44 in accordance with the signals audibly received from the loop. On the shaft 45 of the loop is mounted the core 5 and winding 3 of the controller. The direction indicating card is shown at 46 and the amplifying system of Fig. 1 is shown as enclosed in box A.

Figure 3:
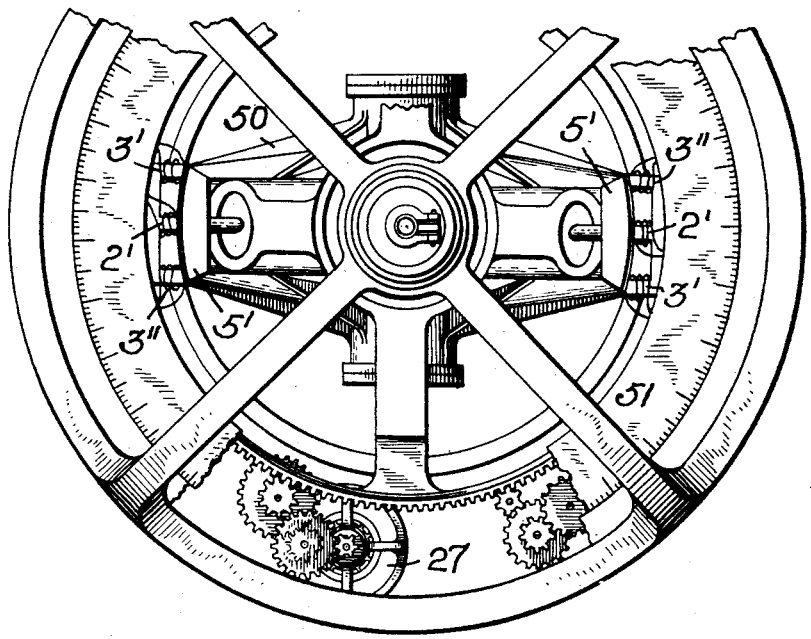

Fig. 3 shows how my invention may be applied to driving the follow-up system of a gyro compass or other gyroscopic apparatus. In this figure the gyroscope or sensitive element is shown generally at 50 and the follow-up element at 51 which is driven by the reversible power motor 27. In this instance the controller has both windings 2' and 3' on the follow-up element, the secondary windings in this instance being split into two opposed windings 3' and 3". The sensitive element has thereon only the iron core 5'. It will readily be seen that relative movement between the sensitive and follow-up elements will vary the output of the opposed coils 3', 3" to actuate the motor as hereinbefore described. This type of controller is described more particularly in my joint application with Frederic M. Watkins, Serial No. 381,660 filed July 27, 1929. The hunt preventing and tremor producing features of my invention have special importance on gyroscopic compasses as explained in the preamble.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a remote control system for reversible motors, a polyphase supply, a controller excited from a phase thereof, a thermionic amplifying system connected thereto, including a detector or input tube having a grid circuit, a transformer having a plurality of secondary windings and powered from said supply for supplying filament, plate and grid potentials thereto, a motor also powered from said supply and governed by the output of said system, a feed-back resistor placed between mid points on the secondary windings of said transformer, a second resistor in series with the grid circuit of the input stage of said system and a bucking transformer having one winding thereof across said resistor and the other winding across said second resistor.

2. In a remote control system for reversible motors, a polyphase supply, a controller excited from a phase thereof, a thermionic amplifying system connected thereto, including a detector or input tube having a grid circuit, a transformer having a plurality of secondary windings and powered from said supply for supplying filament, plate and grid potentials thereto, a motor also powered from said supply and governed by the output of said system, a feed-back resistor placed between mid points on the secondary windings of said transformer, a bucking transformer having one winding thereof across said resistor and the other winding across a second resistor in series with the grid circuit of the input stage, a second resistor in series with the grid circuit of the input stage of said system, and tuning condensers across said windings for maintaining a tremor in said motor.

3. In a remote control system for reversible motors, a polyphase supply, a controller excited from a phase thereof, a thermionic amplifying system connected thereto, including a detector or input tube having a grid circuit, a transformer having a plurality of secondary windings and powered from said supply for supplying filament, plate and grid potentials thereto, a motor also powered from said supply and governed by the output of said system, a feed-back resistor placed between mid points on the secondary windings of said transformer, a bucking transformer having one winding thereof across said resistor and the other winding across a second resistor in series with the grid circuit of the input stage, a second resistor in series with the grid circuit of the input stage of said system and means for tuning the windings of said transformer to produce electrical oscillations in the said tubes producing tremor of like frequency in said motor.

BRUNO A. WITTKUHNS.